(12) United States Patent
Chen et al.

(10) Patent No.: US 11,457,379 B2
(45) Date of Patent: Sep. 27, 2022

(54) CYCLIC REDUNDANCY CHECK LENGTH MANAGEMENT

(71) Applicant: QUALCOMM Incorporated, San Diego, CA (US)

(72) Inventors: Wanshi Chen, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/795,284

(22) Filed: Feb. 19, 2020

(65) Prior Publication Data

US 2020/0187051 A1 Jun. 11, 2020

Related U.S. Application Data

(63) Continuation of application No. 15/046,154, filed on Feb. 17, 2016, now Pat. No. 10,575,210.
(60) Provisional application No. 62/248,786, filed on Oct. 30, 2015.

(51) Int. Cl.
*H04W 28/06* (2009.01)
*H04L 1/00* (2006.01)
*H04W 72/04* (2009.01)

(52) U.S. Cl.
CPC .......... *H04W 28/06* (2013.01); *H04L 1/0061* (2013.01); *H04W 72/0406* (2013.01)

(58) Field of Classification Search
CPC .. H04W 28/06; H04W 72/0406; H04L 1/0061
See application file for complete search history.

(56) References Cited

U.S. PATENT DOCUMENTS

| | | | |
|---|---|---|---|
| 2002/0170013 A1 | 11/2002 | Bolourchi et al. |
| 2003/0093747 A1 | 5/2003 | Brouei et al. |
| 2007/0281695 A1 | 12/2007 | Lohr et al. |
| 2007/0297451 A1 | 12/2007 | Kim et al. |
| 2009/0046808 A1 | 2/2009 | Varadarajan et al. |
| 2010/0070815 A1 | 3/2010 | Papasakellariou et al. |

(Continued)

FOREIGN PATENT DOCUMENTS

| | | |
|---|---|---|
| CN | 101034952 A | 9/2007 |
| CN | 103002468 A | 3/2013 |

(Continued)

OTHER PUBLICATIONS

International Search Report and Written Opinion—PCT/US2016/058417—ISA/EPO—dated Feb. 8, 2017.

(Continued)

*Primary Examiner* — Hashim S Bhatti
(74) *Attorney, Agent, or Firm* — Patterson + Sheridan, L.L.P.

(57) ABSTRACT

Certain aspects of the present disclosure provide methods and apparatus for managing cyclic redundancy check field lengths in wireless communications. An exemplary method generally includes determining a size of a cyclic redundancy check (CRC) field, from a plurality of possible sizes for a given type of physical wireless channel, to be used for a transmission to be sent on the physical wireless channel, and performing communication based on the transmission on the physical wireless channel with the CRC field of the determined size.

26 Claims, 15 Drawing Sheets

(56) References Cited

U.S. PATENT DOCUMENTS

| | | | |
|---|---|---|---|
| 2010/0091713 A1* | 4/2010 | Bui | H04W 28/06 370/328 |
| 2010/0290419 A1 | 11/2010 | Wengerter | |
| 2010/0322184 A1 | 12/2010 | Xiao | |
| 2011/0026799 A1 | 2/2011 | Nehrke et al. | |
| 2011/0044282 A1 | 2/2011 | Seo et al. | |
| 2011/0267996 A1* | 11/2011 | Guan | H04W 72/042 370/280 |
| 2012/0063523 A1* | 3/2012 | Jitsukawa | H04L 1/0026 375/259 |
| 2013/0114570 A1 | 5/2013 | Park et al. | |
| 2013/0227381 A1 | 8/2013 | Akkarakaran et al. | |
| 2013/0343261 A1* | 12/2013 | Gonsa | H04L 5/001 370/315 |
| 2014/0016546 A1 | 1/2014 | Jang et al. | |
| 2014/0056248 A1 | 2/2014 | Wang et al. | |
| 2014/0169555 A1 | 6/2014 | Yajima et al. | |
| 2015/0117349 A1* | 4/2015 | Godley | H04L 29/0604 370/329 |
| 2015/0124741 A1 | 5/2015 | Shieh | |
| 2015/0312936 A1 | 10/2015 | Nguyen et al. | |
| 2015/0349919 A1 | 12/2015 | Engelien-Lopes et al. | |
| 2016/0081065 A1* | 3/2016 | Shi | H04W 74/0833 370/329 |
| 2017/0126439 A1* | 5/2017 | Yoshimoto | H04B 7/0639 |
| 2017/0127316 A1 | 5/2017 | Chen et al. | |
| 2017/0373794 A1* | 12/2017 | Yi | H04L 1/0061 |
| 2018/0198569 A1* | 7/2018 | Lyu | H04W 72/0413 |
| 2018/0254794 A1* | 9/2018 | Lee | H04L 5/0053 |
| 2019/0020442 A1* | 1/2019 | Lyu | H04L 1/0061 |

FOREIGN PATENT DOCUMENTS

| | | |
|---|---|---|
| CN | 104243109 A | 12/2014 |
| CN | 104349460 A | 2/2015 |
| EP | 3355477 A1 | 8/2018 |
| GB | 2514623 A | 12/2014 |
| JP | S6273826 A | 4/1987 |
| JP | 2004531137 A | 10/2004 |
| JP | 2007538425 A | 12/2007 |
| JP | 2013225884 A | 10/2013 |
| WO | 02093296 A2 | 11/2002 |
| WO | 2006024519 A1 | 3/2006 |
| WO | 2009082974 A1 | 7/2009 |
| WO | 2009156798 A1 | 12/2009 |
| WO | 2014076857 A1 | 5/2014 |
| WO | 2016123393 A1 | 8/2016 |
| WO | 2016191600 A1 | 12/2016 |

OTHER PUBLICATIONS

Motorola: "CRC length for Control Channels", 3GPP Draft; R1-074569 CRC Length for Control Channels, 3rd Generation Partnership Project (3GPP), Mobile Competence Centre ; 650, Route Des Lucioles ; F-06921 Sophia-Antipolis Cedex ; France, vol. RAN WG1, No. Korea; Oct. 30, 2007, Oct. 30, 2007 (Oct. 30, 2007), XP050108062, [retrieved on Oct. 30, 2007].

Motorola., et al., "Way Forward on PDCCH CRC Size", 3GPP Draft, R1-075059, Way Forward on PDCCH CRC Size, 3rd Generation Partnership Project (3GPP), Mobile Competence Centre, 650, Route Des Lucioles, F-06921, Sophia-Antipolis Cedex, France, vol. RAN WG1, No. Korea, Nov. 13, 2007, Nov. 13, 2007, XP050108498, 2 pages.

Nokia: "Support for FLO in RRC", 3GPP Draft; GP-023172, 3rd Generation Partnership Project (3GPP), Mobile Competence Centre; 650, Route Des Lucioles; F-06921 Sophia-Antipolis Cedex; France, vol. TSG GERAN, No. Sophia; Nov. 14, 2002, Nov. 14, 2002 (Nov. 14, 2002), XP050007001, 4 pages, [retrieved on Nov. 14, 2002].

NTT Docomo: "Editorial Corrections in TS 25.212 and TS 25.222", 3GPP Draft; R1-00-1477 CR_25.212_222, 3rd Generation Partnership Project (3GPP), Mobile Competence Centre; 650, Route Des Lucioles; F-06921 Sophia-Antipolis Cedex; France, vol. RAN WG1, No. Stockholm, Sweden; Nov. 25, 2000, Nov. 25, 2000 (Nov. 25, 2000), XP050093844, [retrieved on Nov. 25, 2000].

Sony., CRC Size Reduction for LC-MTC M-PDCCW, 3GPP Draft, R1-155883, 3rd Generation Partnership Project (3GPP), Mobile Competence Centre, 650, Route Des Lucioles, F-06921, Sophia-Antipolis Cedex, France, vol. RAN WG1, No. Malmo, Sweden, Oct. 5, 2015-Oct. 9, 2015, Oct. 4, 2015, XP051002671, 2 pages. Retrieved from the Internet: URL:http://www.3gpp.org/ftp/Meetings 3GPPSYNC/RAN1/Docs/.

3rd Generation Partnership Project, Technical Specification Group Radio Access Network, Services provided by the physical layer (Release 13), 3GPP TS 25.302 V13.0.0 (Sep. 2015), Sep. 23, 2015, 34 pages, (pp. 14 to 34, 96 to 102, and 104 to 107).

Huawei: "CRC Size for Stand-Alone Scheduling Information" [online], 3GPP Draft, 3GPP TSG-RAN-WG2 Meeting #44, R1-061408, Shanghai, China, May 8-12, 2006, 7 Pages.

Huawei, Hisilicon: "PD2DSCH Content and Design" [online], 3GPP TSG RAN WG1 Meeting #78bis, R1-143701, Sep. 27, 2014, 8 Pages, Retrieved from the Internet: URL:http://www.3gpp.org/ftp/tsg_ran/WG1_RL1/TSGR1_78b/Docs/R1-143701.zip.

IEC TC 100 VIA SC 29 Secretariat: "IEC CD 62943", 112. MPEG Meeting; Jun. 22, 2015-Jun. 26, 2015; Warsaw; (Motion Picture Expert Group or ISO/IEC JTC1/SC29/WG11), No. m36252, Jun. 8, 2015 (Jun. 8, 2015), XP030064620.

ZTE: "Detailed Design on PUSCH for MTC Enhancement", 3GPP Draft, 3GPP TSG RAN WG1 Meeting #80bis, R1-151730-PUSCH, 3rd Generation Partnership Project (3GPP), Mobile Competence Centre, 650, Route Des Lucioles, F-06921, Sophia-Antipolis Cedex, France, vol. RAN WG1, No. Belgrade, Serbia, Apr. 20, 2015-Apr. 24, 2015, Apr. 19, 2015 (Apr. 19, 2015), XP050934591, 3 pages, Retrieved from the Internet: URL:http://www.3gpp.org/ftp/Meetings_3GPP_SYNC/RAN1/Docs/ [retrieved on Apr. 19, 2015].

* cited by examiner

CYCLIC REDUNDANCY CHECK LENGTH MANAGEMENT

CROSS-REFERENCE TO RELATED APPLICATIONS

The present Application is a Continuation of U.S. application Ser. No. 15/046,154 filed Feb. 17, 2016, and claims priority to U.S. Provisional Application No. 62/248,786, filed Oct. 30, 2015, both of which are assigned to the assignee of the present application and hereby expressly incorporated by reference herein in their entirety.

BACKGROUND

Field of the Disclosure

Certain embodiments of the present disclosure generally relate to managing cyclic redundancy check (CRC) length in wireless communication systems.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, $3^{rd}$ Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

Wireless devices comprise user equipments (UEs) and remote devices. A UE is a device that operates under direct control by humans. Some examples of UEs include cellular phones, smart phones, personal digital assistants (PDAs), wireless modems, handheld devices, laptop computers, netbooks, etc. A remote device is a device that operates without being directly controlled by humans. Some examples of remote devices include sensors, meters, location tags, etc. A remote device may communicate with a base station, another remote device, or some other entity.

SUMMARY

Certain aspects of the present disclosure provide a method for wireless communications. The method generally includes determining a size of a cyclic redundancy check (CRC) field, from a plurality of possible sizes for a given type of physical wireless channel, to be used for a transmission to be sent on the physical wireless channel, and performing communication based on the transmission on the physical wireless channel with the CRC field of the determined size.

Certain aspects of the present disclosure provide an apparatus for wireless communications. The apparatus generally includes at least one processor configured to determine a size of a cyclic redundancy check (CRC) field, from a plurality of possible sizes for a given type of physical wireless channel, to be used for a transmission to be sent on the physical wireless channel and to perform communication based on the transmission on the physical wireless channel with the CRC field of the determined size, and a memory coupled with the at least one processor.

Certain aspects of the present disclosure provide an apparatus for wireless communications. The apparatus generally includes means for determining a size of a cyclic redundancy check (CRC) field, from a plurality of possible sizes for a given type of physical wireless channel, to be used for a transmission to be sent on the physical wireless channel and means for performing communication based on the transmission on the physical wireless channel with the CRC field of the determined size.

Certain aspects of the present disclosure provide a computer readable medium storing computer executable code. The computer executable code generally includes instructions for determining a size of a cyclic redundancy check (CRC) field, from a plurality of possible sizes for a given type of physical wireless channel, to be used for a transmission to be sent on the physical wireless channel and instructions for performing communication based on the transmission on the physical wireless channel with the CRC field of the determined size.

Certain aspects of the present disclosure also include various apparatuses and computer program products capable of performing the operations described above.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
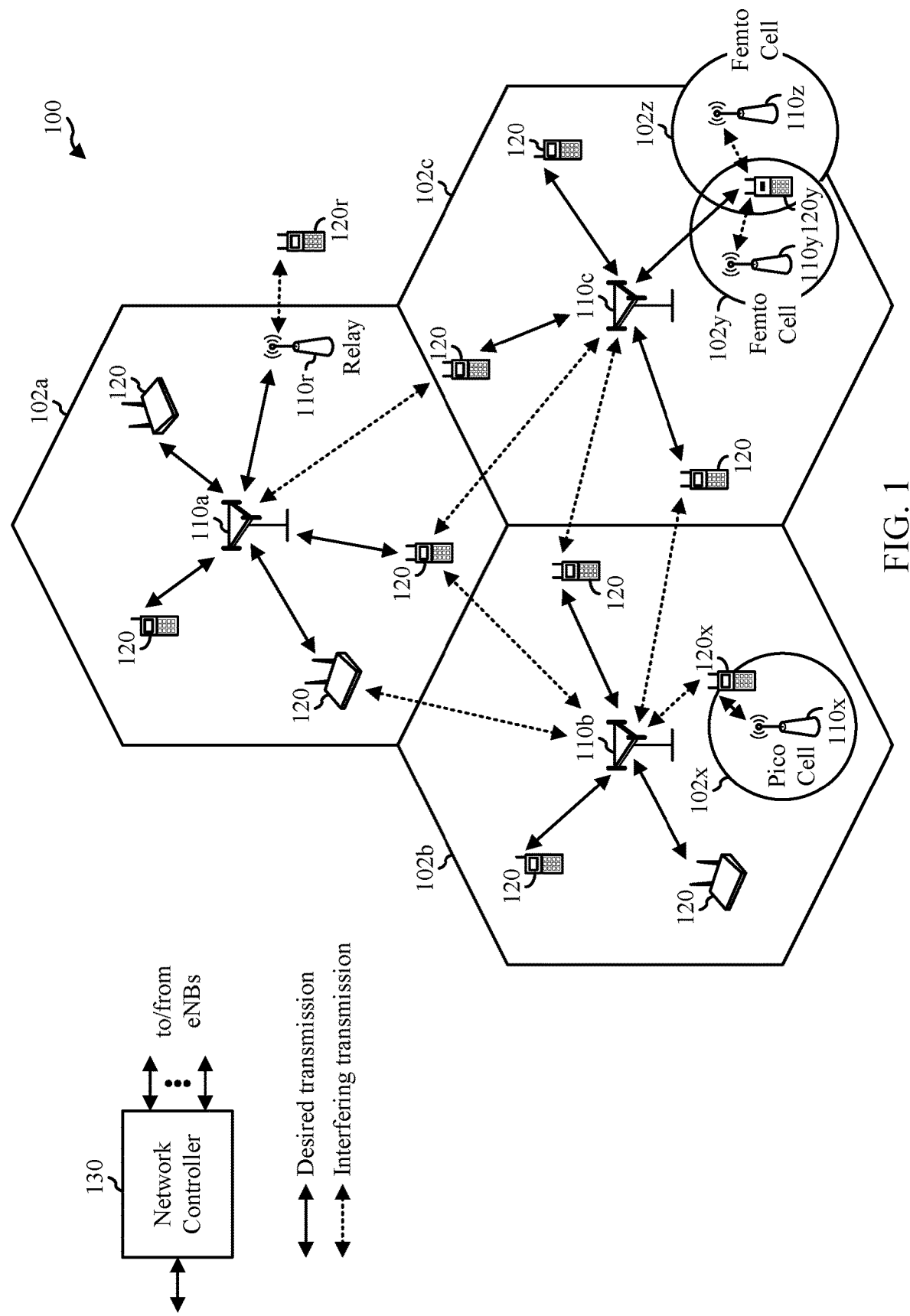
FIG. 1 illustrates a multiple access wireless communication system, according to aspects of the present disclosure.

Certain aspects of the present disclosure provide techniques for managing CRC length (i.e., size) in wireless communications. The provided techniques may allow for communicating (e.g., transmitting, receiving) via data channels while using differing CRC field lengths for different transmissions on a same data channel. That is, a first device may send a transmission to a second device using a determined CRC field length, and the second device may determine from one or more indications the CRC field length, and error check the transmission using a CRC of the determined length.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 shows a wireless communication network 100 in which aspects of the present disclosure may be practiced. For example, evolved Node Bs 110 and user equipments (UEs) 120 may communicate with each other using extended signaling as described herein.

Wireless communication network 100 may be an LTE network. The wireless network 100 may include a number of evolved Node Bs (eNBs) 110 and other network entities. An eNB may be a station that communicates with the UEs and may also be referred to as a base station, an access point, etc. A Node B is another example of a station that communicates with the UEs.

Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal fast Fourier transform (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

The wireless network 100 may also include UEs 120 capable of communicating with a core network via one or more radio access networks (RANs) that implement one or more radio access technologies (RATs). For example, according to certain aspects provided herein, the wireless network 100 may include co-located access points (APs) and/or base stations that provide communication through a first RAN implementing a first RAT and a second RAN implementing a second RAT. According to certain aspects, the first RAN may be a wide area wireless access network (WWAN) and the second RAN may be a wireless local area network (WLAN). Examples of WWAN may include, but not be limited to, for example, radio access technologies (RATs) such as LTE, UMTS, cdma2000, GSM, and the like. Examples of WLAN may include, but not be limited to, for example, RATs such as Wi-Fi or IEEE 802.11 based technologies, and the like.

According to certain aspects provided herein, the wireless network 100 may include co-located Wi-Fi access points (APs) and femto eNBs that provide communication through Wi-Fi and cellular radio links. As used herein, the term "co-located" generally means "in close proximity to," and applies to Wi-Fi APs or femto eNBs within the same device enclosure or within separate devices that are in close proximity to each other. According to certain aspects of the present disclosure, as used herein, the term "femtoAP" may refer to a co-located Wi-Fi AP and femto eNB.

Figure 2:
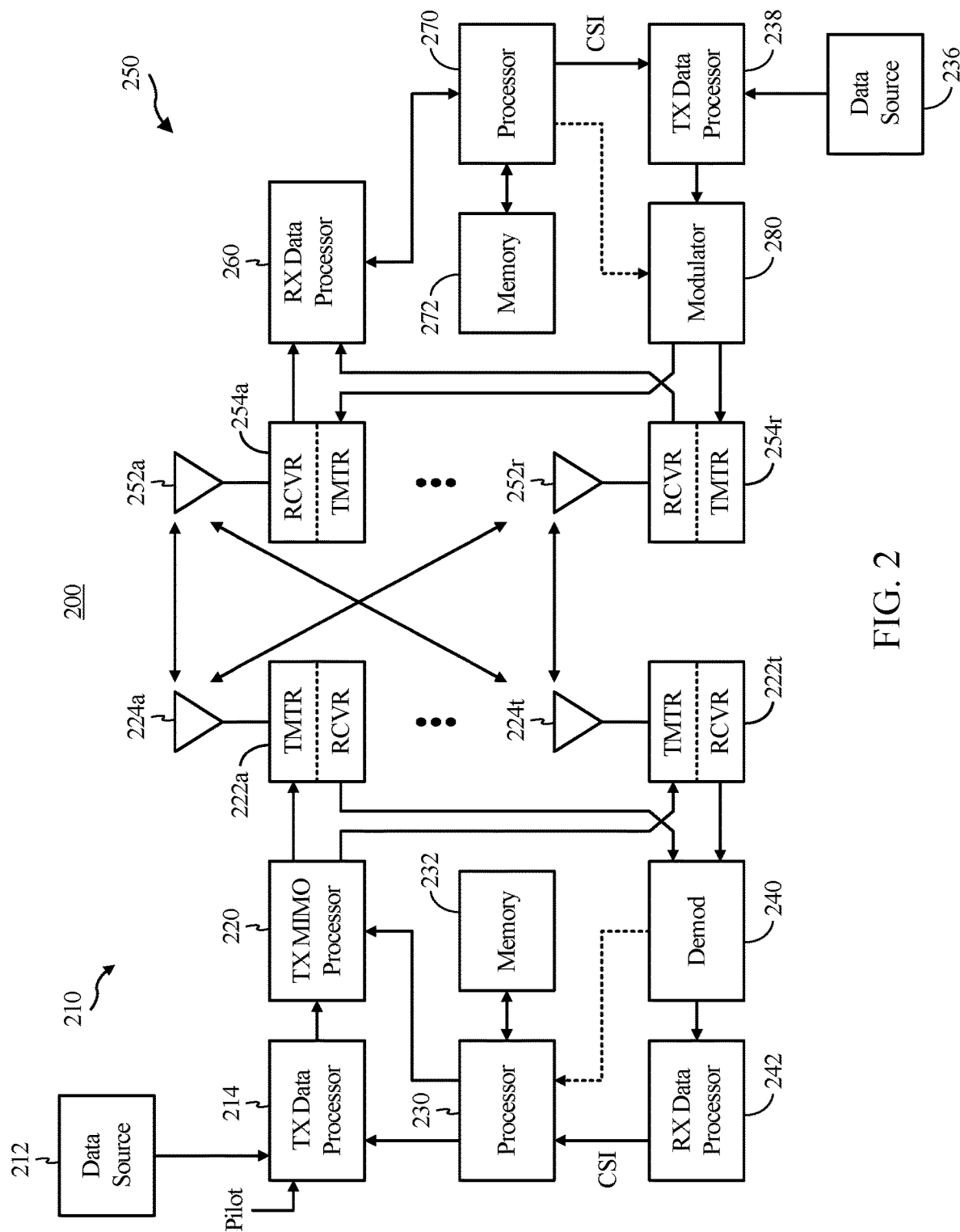
FIG. 2 is a block diagram of a communication system, according to aspects of the present disclosure.

FIG. 2 is a block diagram of an embodiment of a transmitter system 210 (also known as an access point (AP)) and a receiver system 250 (also known as a user equipment (UE)) in a system, such as a MIMO system 200. Aspects of the present disclosure may be practiced in the transmitter system (AP) 210 and the receiver system (UE) 250. For example, transmitter system 210 may be configured to determine a size of a CRC field to use when communicating with a user equipment using one or more data channels, as described below with reference to FIG. 5. Receiver system 250 may also be configured to determine a size of a CRC field to use when communicating with a base station using one or more data channels, also as described below with reference to FIG. 5.

At the transmitter system 210, traffic data for a number of data streams is provided from a data source 212 to a transmit (TX) data processor 214. In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., binary phase shift keying (BPSK), quadrature phase shift keying (QSPK), M-ary phase shift keying (M-PSK), or M-ary quadrature amplitude modulation (M-QAM)) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

According to certain aspects, the controllers/processors 230 and 270 may direct the operation at the transmitter system 210 and the receiver system 250, respectively. According to an aspect, the processor 230, TX data processor 214, and/or other processors and modules at the transmitter system 210 may perform or direct processes for the techniques described herein. According to another aspect, the processor 270, RX data processor 260, and/or other processors and modules at the receiver system 250 may perform or direct processes for the techniques described herein. For example, the processor 230, TX data processor 214, and/or other processors and modules at the transmitter system 210 may perform or direct operations 500 in FIG. 5. For example, the processor 270, RX data processor 260, and/or other processors and modules at the receiver system 250 may perform or direct operations 600 in FIG. 6.

In an aspect, logical channels are classified into Control Channels and Traffic Channels. Logical Control Channels comprise Broadcast Control Channel (BCCH), which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing a radio resource control (RRC) connection, this channel is used by UEs that receive MBMS. Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH), the PCH for support of UE power saving (discontinuous reception (DRX) cycle is indicated by the network to the UE), broadcasted over entire cell and mapped to physical (PHY) resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

In an aspect, a channel structure is provided that preserves low PAPR (at any given time, the channel is contiguous or uniformly spaced in frequency) properties of a single carrier waveform.

Figure 3:
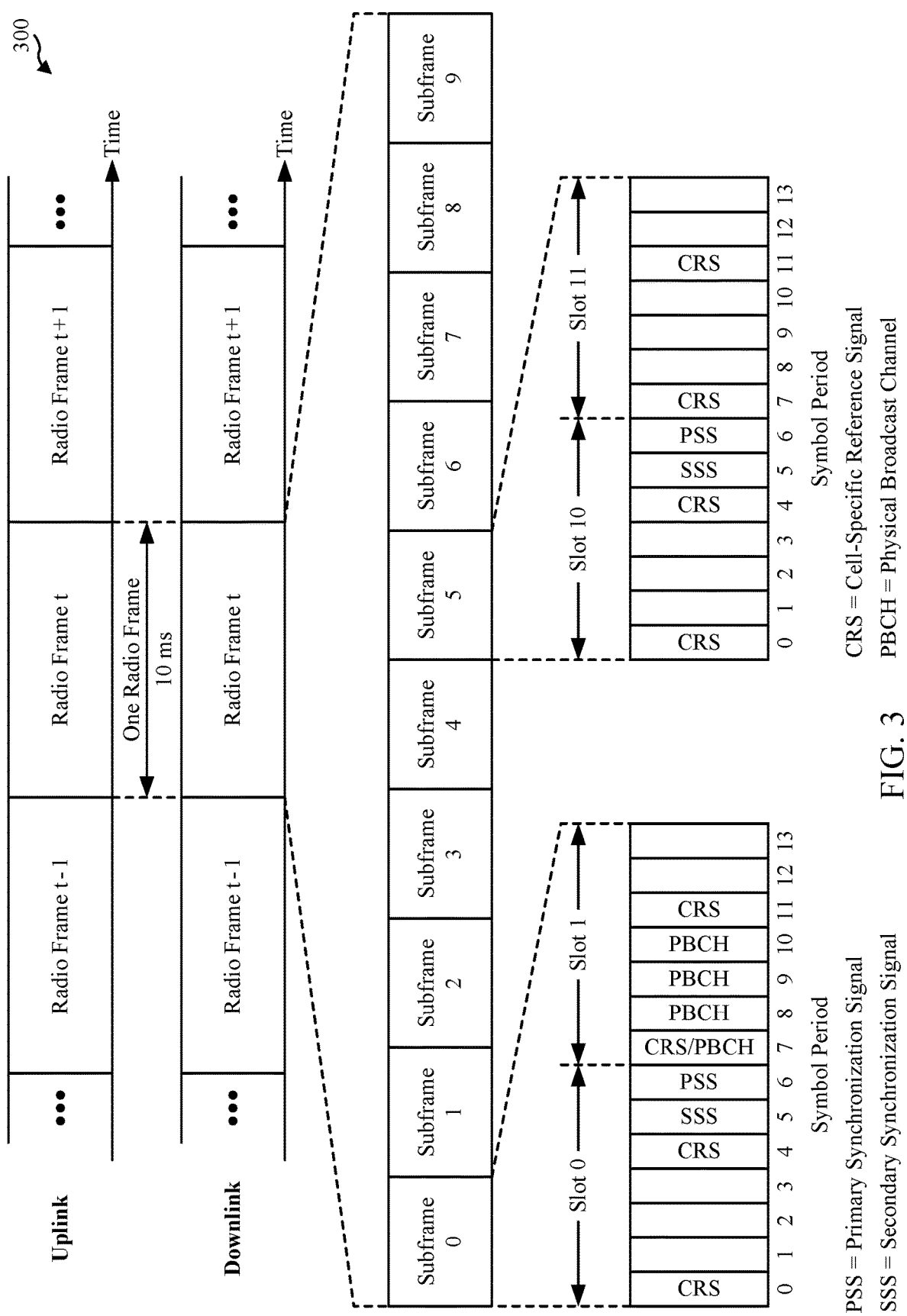
FIG. 3 illustrates an example frame structure, according to aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. During cell search and acquisition the terminal detects the cell frame timing and the physical-layer identity of the cell from which the terminal learns the start of the references-signal sequence (given by the frame timing) and the reference-signal sequence of the cell (given by the physical layer cell identity). The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. In aspects, different and/or additional reference signals may be employed. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
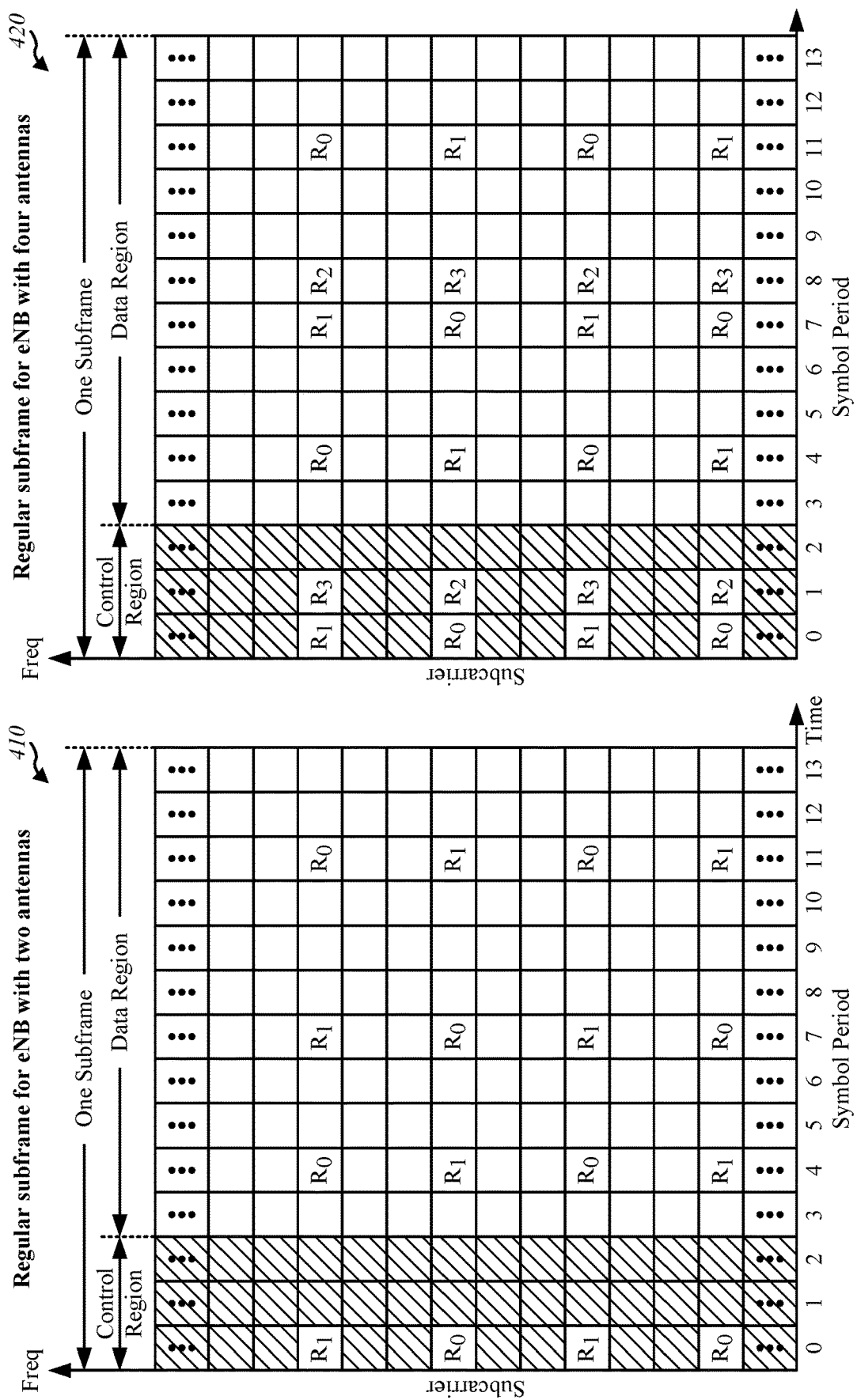
FIG. 4 illustrates an example subframe resource element mapping, according to aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q–1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example Cyclic Redundancy Check Length Management

In LTE wireless communications systems, cyclic redundancy check (CRC) fields are used for error detection for different types of channels. A receiving device may calculate a CRC for the non-CRC fields of a received transmission and determine if the calculated CRC matches the CRC received in the CRC field of the transmission. In some cases, interference may cause a device to receive a transmission incorrectly, but the received CRC, which may be incorrect due to interference, matches the incorrect transmission, and the device treats the received transmission as valid when the device should treat the received transmission as invalid. When a device receives a control channel and matches the calculated CRC to the received CRC, the device may be said to have decoded the control channel.

When a device decodes a control channel that is not intended for the device (e.g., interference caused changes in the transmission to cause it to match the received CRC), that may be referred to as a false alarm. For most control channels in current LTE standards (e.g., fourth generation (4G)), the CRC field is sixteen bits long, resulting in roughly a $10^{-5}$ (i.e., 1 in 100,000) probability of a false alarm for a single control channel decoding. For data channels in current LTE standards, in both downlink (DL) and uplink (UL), a twenty-four bit CRC is used, resulting in roughly a $10^{-7}$ (i.e., 1 in 10,000,000) probability of a false alarm for a single channel decoding. For uplink control information (UCI) in current LTE standards, an eight-bit CRC may be used in some cases, resulting in roughly a $10^{-2}$ (i.e., 1 in 100) probability of a false alarm for a single channel decoding.

In the field of 3GPP wireless communications technology, development of fifth generation (5G) technology is taking place. 5G is expected to offer a wide range of services, such as extended wideband, Internet of things, ultra low latency, and ultra high reliability. In particular, for ultra high reliability, a probability of $10^{-9}$ (i.e., 1 chance in 1,000,000,000) or lower of a false alarm is desired. To achieve such a low probability of a false alarm implies that CRC length for data packets should be increased from the current (e.g., used in fourth generation LTE) 24 bits to a longer length, e.g., 32 bits, 48 bits, etc.

In 3GPP wireless communications, there are different traffic types which may be carried by a same physical data channel. Designing the physical data channel to always use a CRC length corresponding to the most demanding traffic type, for example, always using a 36-bit CRC for the physical data channel, is unnecessarily inefficient for some UEs and/or for some traffic types and/or some data sizes. For example, for voice over Internet protocol (VoIP) and similar services, there is no need to have a 36-bit CRC, because VoIP is frequently transmitted as a stream of small (e.g., 46 bytes of data) packets, with each packet conveying twenty milliseconds of sound (or other data) of the VoIP call. Thus, with each packet conveying such a small quantity of data, a 16-bit or 24-bit CRC is more than sufficient. A 36-bit CRC, for example, will incur more overhead than smaller CRCs. As an example, for small data packets, using a 24-bit CRC saves twelve bits of overhead in every packet when compared to using a 36-bit CRC in every packet, which can be significant. For example, if the data packet size is 24 bits, the comparison will be 48 bits per packet (24 bits of data and 24 bits of CRC) when using a 24-bit CRC compared to 60 bits per packet (24 bits of data and 36 bits of CRC) when using a 36-bit CRC respectively, which may be approximately a 1.2 decibel (dB) difference (60 vs. 48) between signals.

According to aspects of the present disclosure, for a given channel and a given transmission, a wireless device (e.g., a UE, an eNB) is further indicated a CRC length to use for the given transmission. In a first example, a control channel transmitted to a UE may include a one-bit indicator to indicate whether a 24-bit CRC or a 36-bit CRC is to be used by the UE when transmitting or receiving the transmission using the channel. In the example, a UE may receive a control channel indicating a data transmission is going to be transmitted to the UE on a physical data channel, and one-bit indicator in the control channel indicates whether the UE should decode the data transmission using a 24-bit CRC or a 36-bit CRC. Still in the example, the UE would then receive the data transmission and attempt to decode the data transmission using a CRC of the indicated (e.g., 24 bits or 36 bits) size. In a second example, a UE may receive a control channel indicating the UE has been allocated transmission resources of a physical data channel to transmit a data transmission, and a one-bit indicator in the control channel indicates whether the UE should include a 24-bit CRC or a 36-bit CRC in the data transmission. In the second example, the UE would transmit data in a data transmission with a CRC of the indicated size on the allocated transmission resources, and a receiving device (e.g., an eNodeB) would attempt to decode the data transmission using a CRC of the indicated size.

According to aspects of the present disclosure, CRCs of different sizes may be calculated using different formulas. For example, a 32-bit CRC may be calculated using a generator polynomial of degree 32, while a 24-bit CRC may be calculated using a generator polynomial of degree 24, with not all of the terms of the generator polynomial of degree 24 contained in the generator polynomial of degree 32. As a second example, a 32-bit CRC may be obtained by concatenating a 24-bit CRC and an 8-bit CRC.

Figure 5:
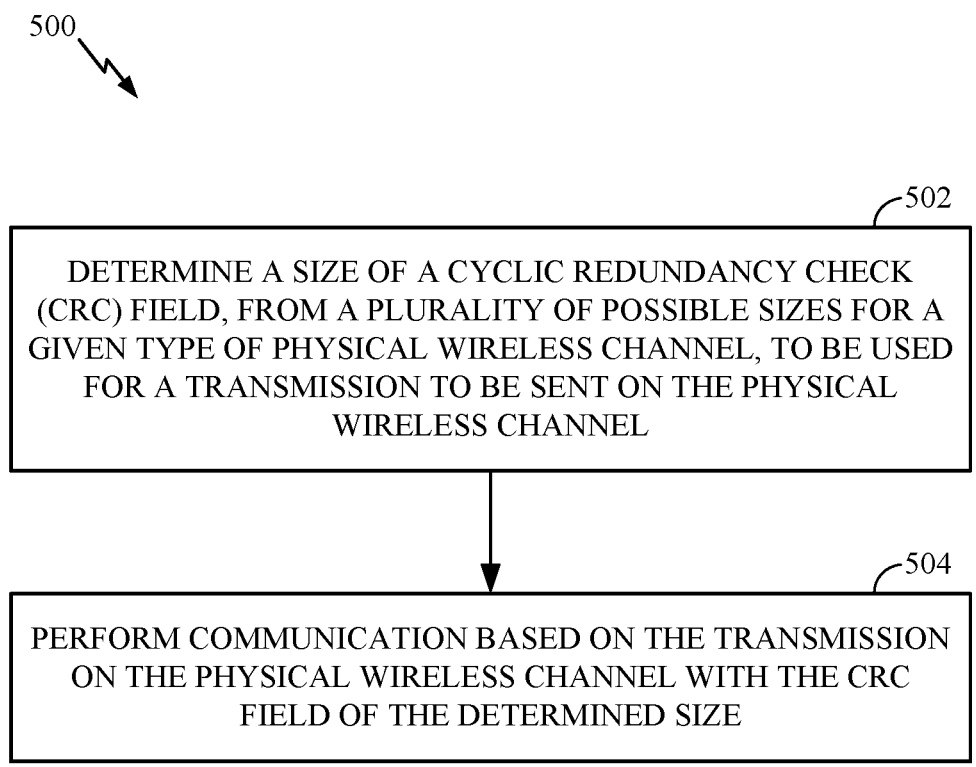
FIG. 5 illustrates example operations for wireless communications, according to aspects of the present disclosure.

FIG. 5 illustrates example operations 500 for wireless communications, in accordance with aspects of the present disclosure. The operations 500 may be performed a BS, UE, or other type of wireless communications device.

The operations 500 begin at 502, where a device determines a size of a cyclic redundancy check (CRC) field, from a plurality of possible sizes for a given type of physical wireless channel, to be used for a transmission to be sent on the physical wireless channel. At 504, the device performs communication based on the transmission on the physical wireless channel with the CRC field of the determined size.

Figure 6:
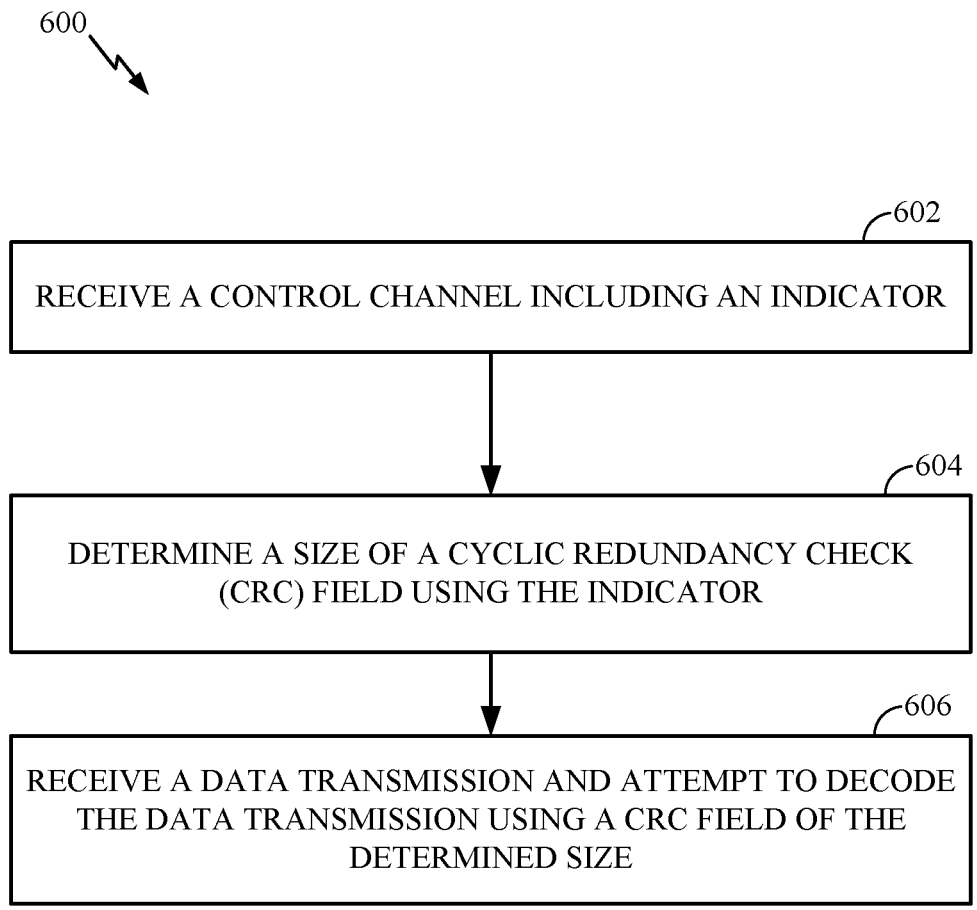
FIG. 6 is a flowchart of steps taken by a UE or eNB, according to aspects of the present disclosure.

FIG. 6 is a flowchart 600 of the steps taken by a UE in the above first example. In step 602, the UE receives a control channel including an indicator. Next, in step 604 the UE determines a size of a CRC field using the indicator. Last, in step 606 the UE receives a data transmission and attempts to decode the data transmission using a CRC of the determined size. In another example, similar steps may be taken by an eNodeB to decode a received control and/or data transmission.

According to aspects of the present disclosure, a device may determine the size of the CRC field based on an indication obtained by the device. The indication may be explicit, implicit, or a combination of both.

According to aspects of the present disclosure, a device may obtain an explicit indication of a CRC size to use for the transmission on the physical wireless channel from an information field in a control channel. For example, a UE may receive a physical downlink control channel (PDCCH) allocating transmission resources for a physical downlink shared channel (PDSCH) conveying a data transmission to the UE, and the PDCCH may have a one-bit field set to a value of one. In the example, the UE may receive the PDCCH. Still in the example, the UE may determine, based on the one-bit field value of one, that the PDSCH will be transmitted using a 36-bit CRC field, and the UE may then receive the PDSCH and attempt to decode the PDSCH using a 36-bit CRC field (i.e., the UE calculates a 36-bit CRC for the PDSCH and determines if the calculated CRC matches a 36-bit CRC included with the PDSCH).

Figure 7:
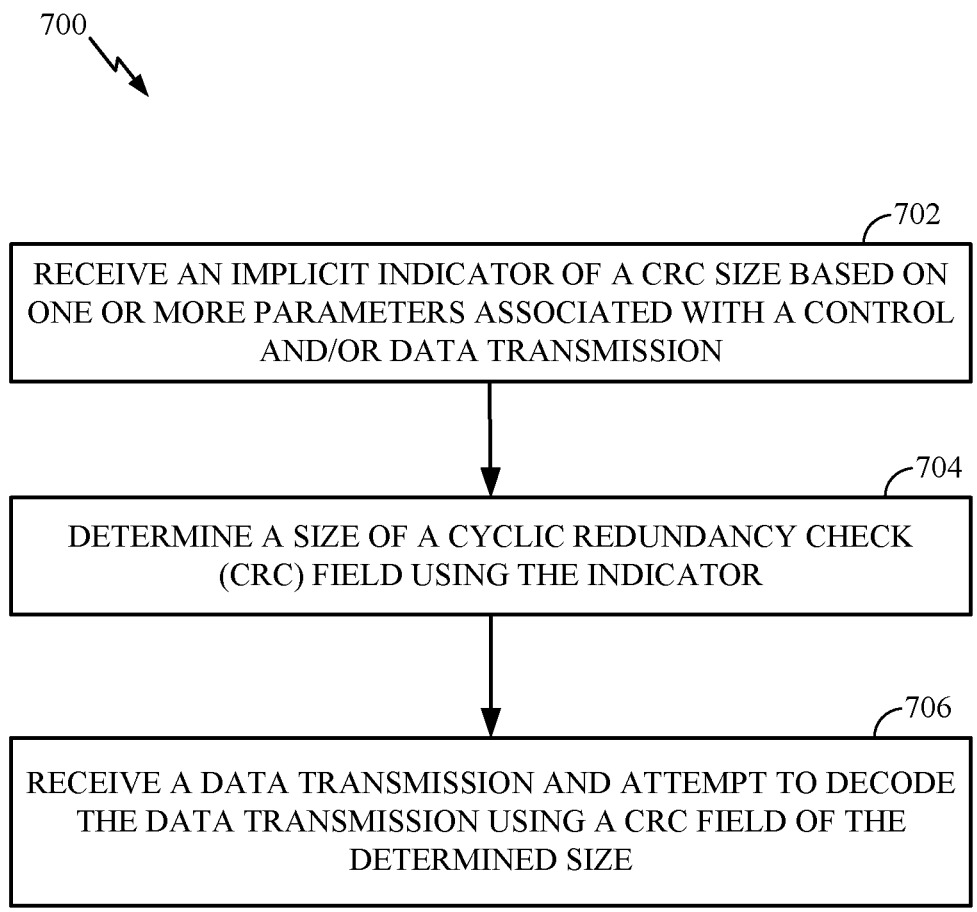
FIG. 7 is a flowchart of steps taken by a UE or eNB, according to aspects of the present disclosure.

According to aspects of the present disclosure, a device may obtain an implicit indication of a CRC size to use for the transmission on the physical wireless channel based on one or more parameters associated with the control and/or data transmission. For example, a UE may be configured to always use a 36-bit CRC when communicating (e.g., receiving or transmitting) data using transport blocks with a size larger than or equal to a threshold size (e.g., larger than 1024 bits) and to always use a 24-bit CRC when communicating with transport blocks smaller than the threshold size. FIG. 7 is a flowchart 700 of the steps taken by a UE in the above first example. In step 702, the UE receives an implicit indicator of a CRC size based on one or more parameters associated with a control and/or data channel. Next, in step 704 the UE determines a size of a CRC field using the indicator. Last, in step 706 the UE receives a data transmission and attempts to decode the data transmission using a CRC of the determined size. In another example, similar steps may be taken by an eNodeB to decode a received control and/or data transmission.

Figure 8:
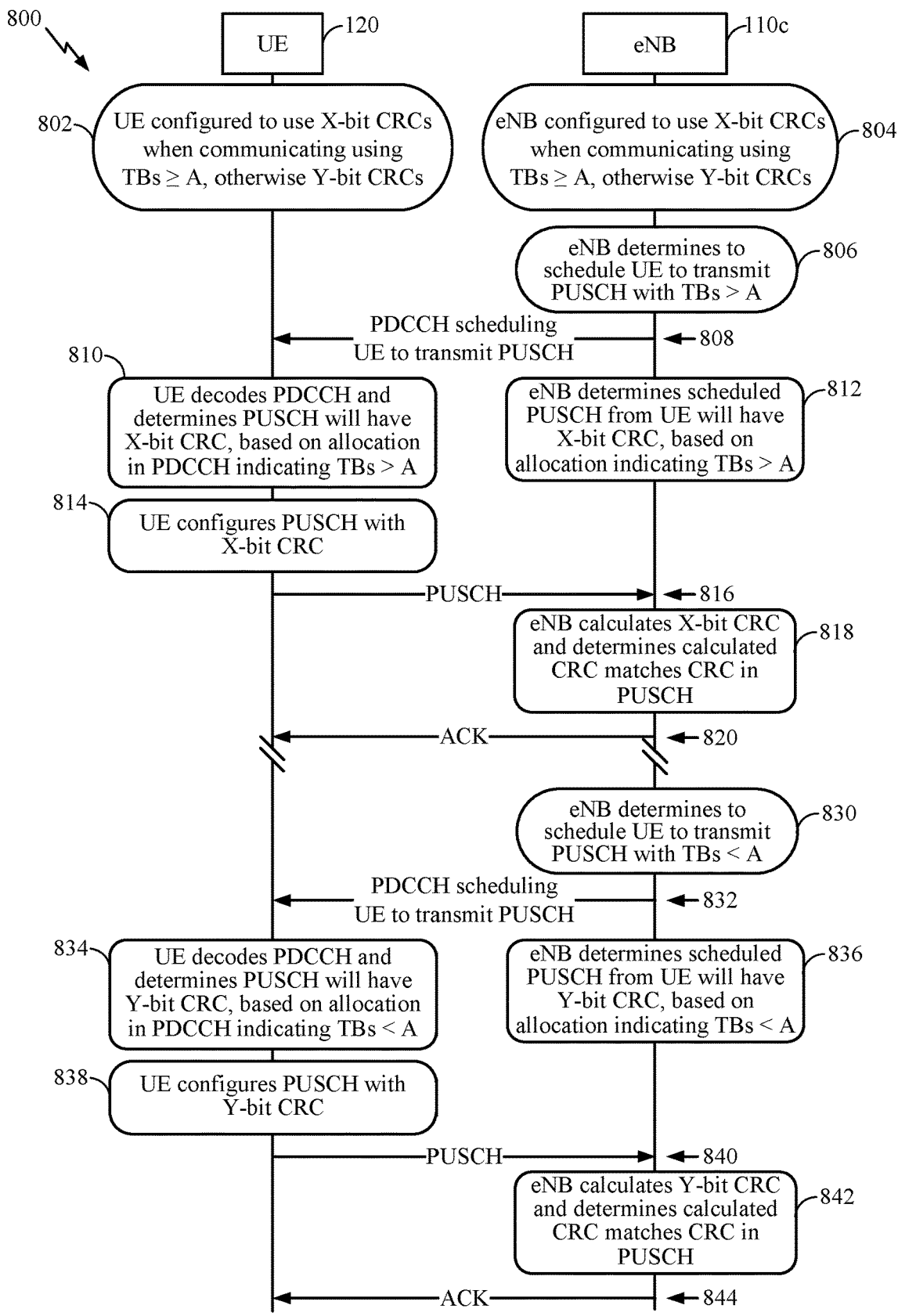
FIG. 8 illustrates an exemplary call flow of a wireless device obtaining an implicit indication of a CRC size based on a transport block size of the communication, according to aspects of the present disclosure.

FIG. 8 illustrates an exemplary call flow 800 of a wireless device obtaining an implicit indication of a CRC size to use for communication on a physical wireless channel, based on a transport block size of the communication. In the exemplary call flow, at 802 and 804, eNB 110c (see FIG. 1) and UE 120 (see FIG. 1) are configured to use CRCs of X (e.g. 24) bits when communicating using TBs of size greater than or equal to A (e.g., 1024 bits) and to use CRCs of Y (e.g., 16) bits otherwise. The eNB determines to schedule the UE to transmit a PUSCH with a TB size larger than A at 806. At 808, the eNB sends a PDCCH scheduling the UE to transmit the PUSCH. At 810, the UE decodes the PDCCH and determines that the PDCCH is scheduling the UE to transmit a PUSCH with an X-bit CRC, based on the allocation in the PDCCH indicating that the PUSCH will use a TB size larger than A. At 812, the eNB determines that the scheduled PUSCH will have an X-bit CRC, based on the determination that the PUSCH will use a TB size larger than A. The UE configures the scheduled PUSCH with an X-bit CRC at 814. At 816, the UE transmits and the eNB receives the PUSCH. The eNB calculates an X-bit CRC for the PUSCH and determines if the calculated CRC matches the CRC in the PUSCH at 818. In the exemplary call flow, the calculated CRC matches the CRC in the PUSCH, and the eNB sends an ACK acknowledging the PUSCH at 820. Later, the eNB determines to schedule the UE to transmit a second PUSCH with a TB size smaller than A at 830. At 832, the eNB sends a second PDCCH scheduling the second PUSCH to the UE. The UE decodes the second PDCCH and determines that the second PDCCH is scheduling the UE to transmit a second PUSCH with a Y-bit CRC, based on the allocation in the second PDCCH indicating that the second PUSCH will use a TB size smaller than A at 834. At 836, the eNB determines that the scheduled second PUSCH will have a Y-bit CRC, based on the determination that the second PUSCH will use a TB size smaller than A. At 838, the UE configures the second PUSCH with a Y-bit CRC. At 840, the UE transmits and the eNB receives the second PUSCH. The eNB calculates a Y-bit CRC for the second PUSCH and determines if the calculated CRC matches the CRC in the second PUSCH at 842. In the exemplary call flow, the calculated CRC matches the CRC in the second PUSCH, and the eNB sends an ACK acknowledging the second PUSCH at 844.

According to aspects of the present disclosure, a device may obtain an indication of a CRC size to use for the transmission on the physical wireless channel based on a combination of an explicit indication (e.g., a bit in a control channel) and an implicit indication (e.g., based on one or more parameters associated with the transmission). For example, a UE may be configured to always use a 36-bit CRC when communicating (e.g., receiving or transmitting) data using data packets with a size larger than or equal to a threshold size (e.g., larger than 1024 bits) and to determine, based on a bit in a PDCCH, whether to use a 24-bit CRC or a 36-bit CRC when communicating with data packets smaller than the threshold size.

Figure 9:
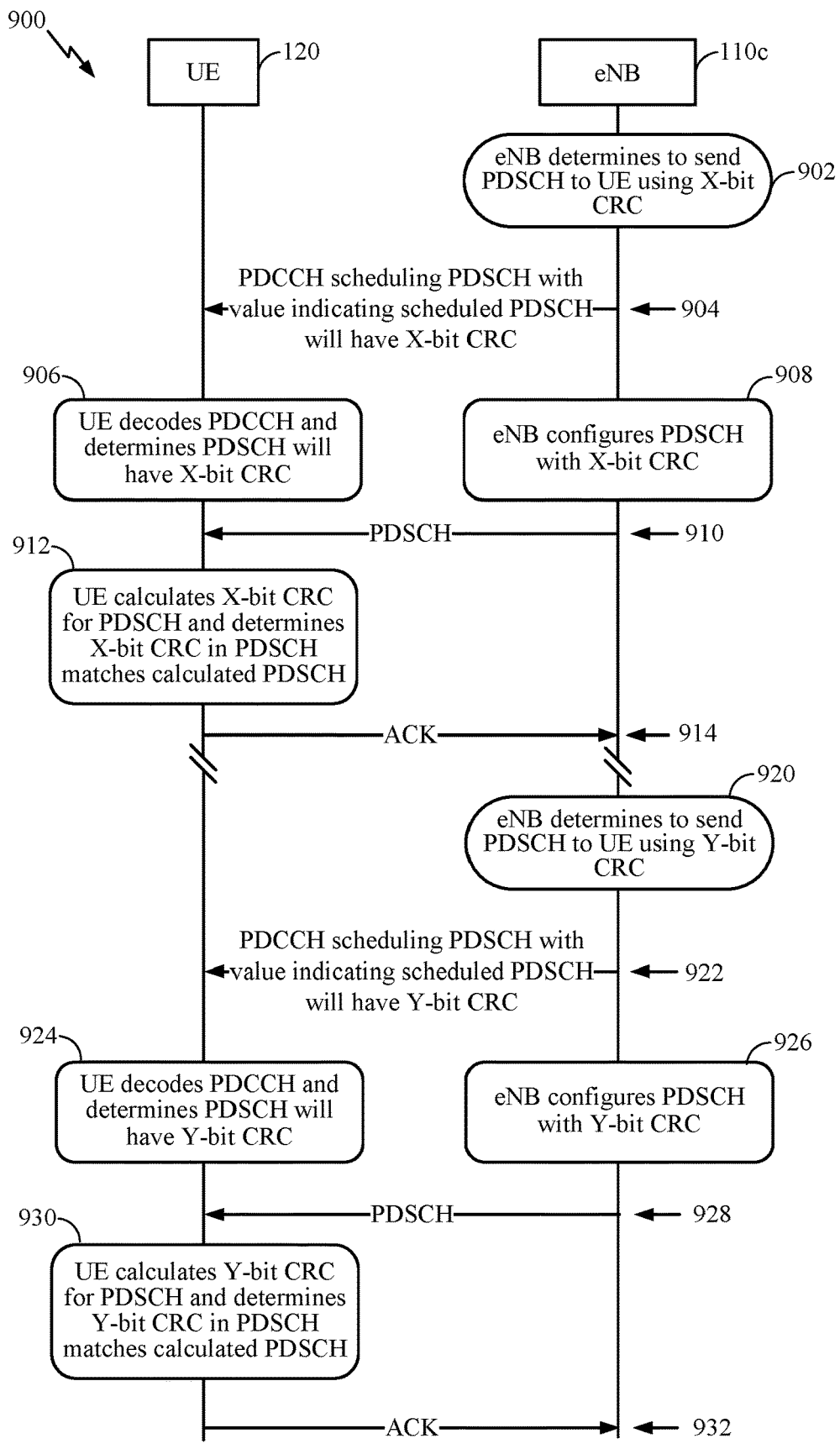
FIG. 9 illustrates an exemplary call flow of a wireless device obtaining an explicit indication of a CRC size, according to aspects of the present disclosure.

FIG. 9 illustrates an exemplary call flow 900 of a wireless device obtaining an explicit indication of a CRC size to use for communication on a physical wireless channel. In the exemplary call flow, eNB 110c (see FIG. 1) determines to send a PDSCH with a CRC of X (e.g., 36) bits to UE 120 (see FIG. 1) at 902. At 904, the eNB sends a PDCCH scheduling the PDSCH to the UE. The PDCCH includes one or more explicit values (e.g., in a field of the PDCCH) indicating that the scheduled PDSCH will have an X-bit CRC. At 906, the UE decodes the PDCCH and determines that the PDCCH is scheduling a PDSCH with an X-bit CRC and directed to the UE. The eNB configures the scheduled PDSCH with an X-bit CRC at 908. At 910, the eNB transmits and the UE receives the PDSCH. The UE calculates an X-bit CRC for the PDSCH and determines if the calculated CRC matches the CRC in the PDSCH at 912. In the exemplary call flow, the calculated CRC matches the CRC in the PDSCH, and the UE sends an ACK acknowledging the PDSCH at 914. Later, the eNB determines to send a second PDSCH with a CRC of Y (e.g., 24) bits to the UE at 920. At 922, the eNB sends a second PDCCH scheduling the PDSCH to the UE. The UE decodes the second PDCCH and determines that the second PDCCH is scheduling a second PDSCH with a Y-bit CRC and directed to the UE at 924. At 926, the eNB configures the scheduled second PDSCH with a Y-bit CRC. At 928, the eNB transmits and the UE receives the second PDSCH. The UE calculates a Y-bit CRC for the second PDSCH and determines if the calculated CRC matches the CRC in the second PDSCH at 930. In the exemplary call flow, the calculated CRC matches the CRC in the second PDSCH, and the UE sends an ACK acknowledging the second PDSCH at 932.

According to aspects of the present disclosure, the indication of CRC size to use may be dynamic or semi-static. For example, a UE may be configured via RRC signaling a CRC field size to use, or indicated/activated via a downlink control information (DCI) a CRC field size to use, with the UE communicating using the indicated size of CRC field until the UE receives a new configuration or a different DCI.

Figure 10:
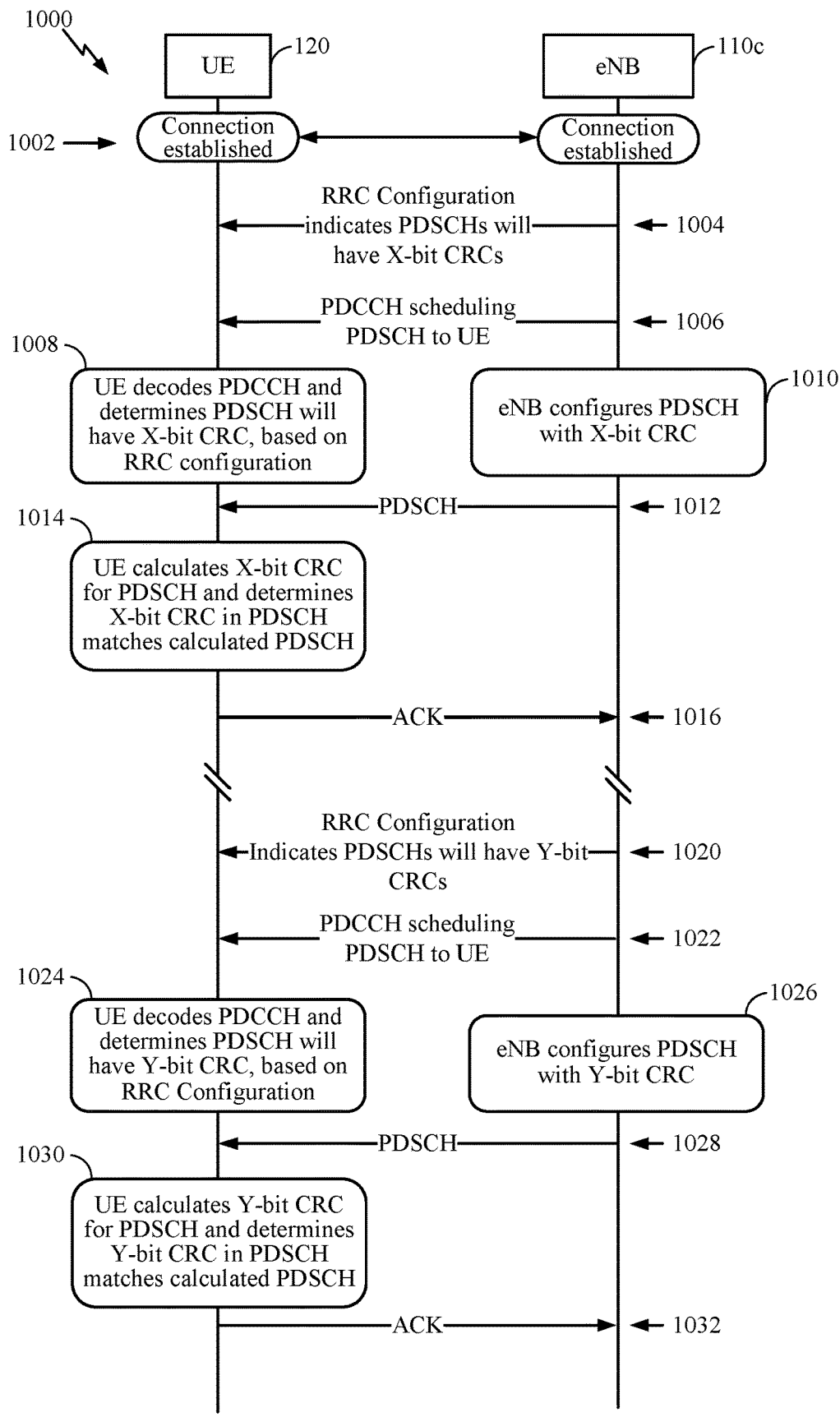
FIG. 10 illustrates an exemplary call flow of a wireless device obtaining an explicit semi-static indication of a CRC size, according to aspects of the present disclosure.

FIG. 10 illustrates an exemplary call flow 1000 of a wireless device obtaining an explicit semi-static indication of a CRC size to use for communication on a physical wireless channel. In the exemplary call flow, eNB 110c and UE 120 establish a connection at 1002. At 1004, the eNB sends an RRC configuration indicating that PDSCHs from the eNB to the UE will have CRCs of X (e.g., 36) bits. The RRC configuration may be sent during the connection establishment at 1002 or later. The eNB sends a PDCCH scheduling a PDSCH to the UE at 1006. At 1008, the UE decodes the PDCCH and determines that the PDSCH scheduled by the PDCCH will have an X-bit CRC, based on the RRC configuration. The eNB configures the scheduled PDSCH with an X-bit CRC at 1010. At 1012, the eNB transmits and the UE receives the PDSCH. The UE calculates an X-bit CRC for the PDSCH and determines if the calculated CRC matches the CRC in the PDSCH at 1014. In the exemplary call flow, the calculated CRC matches the CRC in the PDSCH, and the UE sends an ACK for the PDSCH at 1016. Later, the eNB determines to send a new RRC configuration indicating that PDSCHs will have Y-bit CRCs at 1020. The new RRC configuration may be sent while the UE and eNB remain RRC connected or as part of a new RRC connection procedure. The eNB sends a PDCCH scheduling a second PDSCH to the UE at 1022. The UE decodes the second PDCCH, determines that the second PDCCH is scheduling a second PDSCH directed to the UE, and determines that the second PDSCH will have a Y-bit CRC based on the new RRC configuration at 1024. At 1026, the eNB configures the scheduled second PDSCH with a Y-bit CRC. At 1028, the eNB transmits and the UE receives the second PDSCH. The UE calculates a Y-bit CRC for the second PDSCH and determines if the calculated CRC matches the CRC in the second PDSCH at 1030. In the exemplary call flow, the calculated CRC matches the CRC in the second PDSCH, and the UE sends an ACK of the second PDSCH at 1032.

According to aspects of the present disclosure, the support of various CRC lengths may be UE capability or UE category dependent. For example, a BS may transmit data to a first UE that does not support 36-bit CRC fields (e.g., an older UE) via a PDSCH using packets including 24-bit CRC fields and transmit the same type of data via a PDSCH to a second UE (e.g., a newer UE that supports 36-bit CRC fields) using packets including 36-bit CRC fields.

Figure 11:
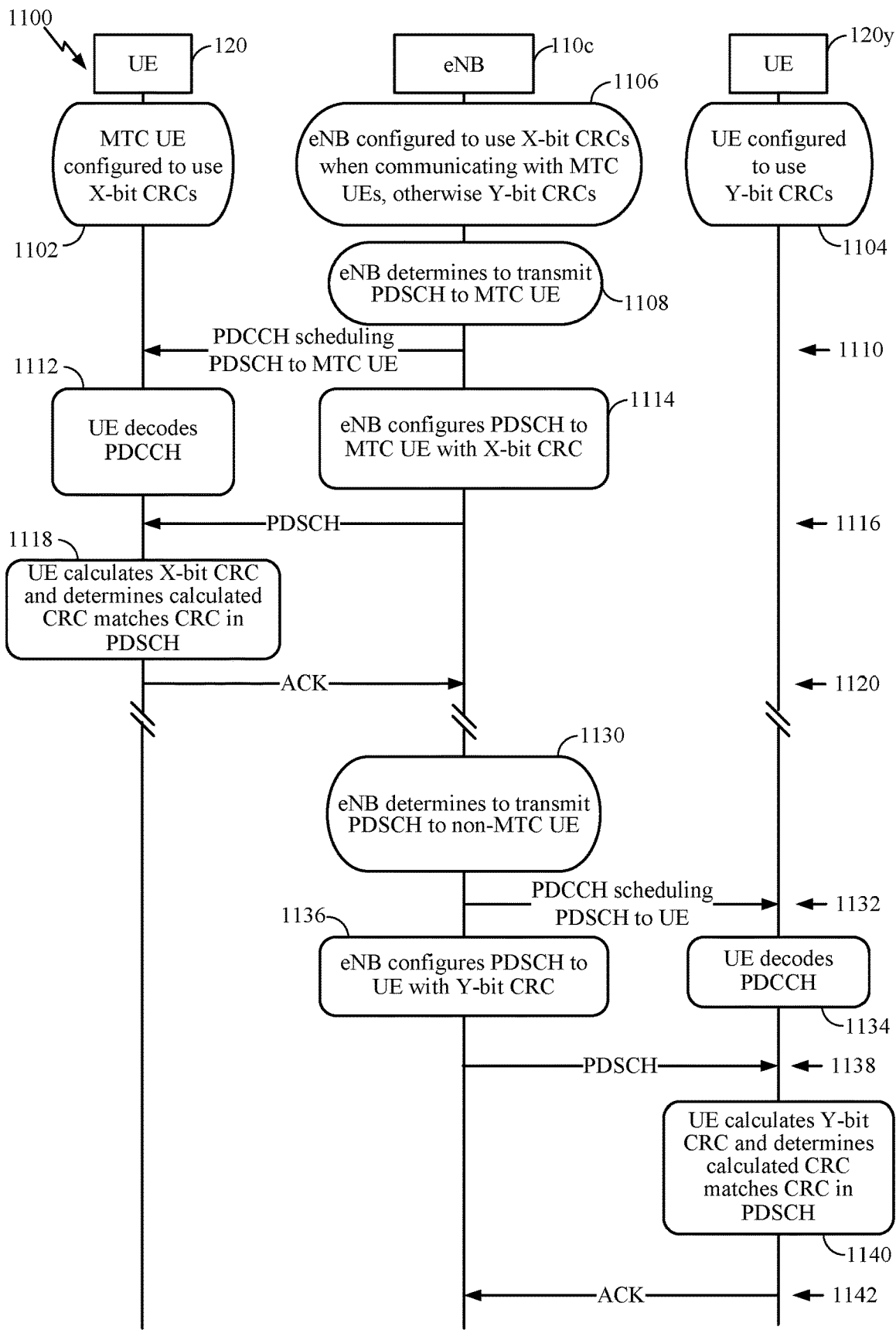
FIG. 11 illustrates an exemplary call flow of a wireless device obtaining an implicit indication of a CRC size based on a UE capability, according to aspects of the present disclosure.

FIG. 11 illustrates an exemplary call flow 1100 of a wireless device obtaining an implicit indication of a CRC size to use for communication on a physical wireless channel, based on a UE capability. In the exemplary call flow, at 1102, UE 120, which is an MTC UE, is configured to use CRCs of X (e.g. 16) bits when communicating. At 1104, UE 120y (see FIG. 1), which is a non-MTC UE is configured to use CRCs of Y (e.g. 24) bits when communicating. At 1106, eNB 110c is configured to use CRCs of X bits when communicating with MTC UEs and to use CRCs of Y bits otherwise. The eNB determines to transmit a PDSCH to the MTC UE at 1108. At 1110, the eNB sends a PDCCH scheduling the PDSCH to the UE. At 1112, the UE decodes the PDCCH and determines that the PDCCH is scheduling the PDSCH to the UE. The eNB configures the scheduled PDSCH with an X-bit CRC at 1114. At 1116, the eNB transmits and the MTC UE receives the PUSCH. The MTC UE calculates an X-bit CRC for the PDSCH and determines if the calculated CRC matches the CRC in the PDSCH at 1118. In the exemplary call flow, the calculated CRC matches the CRC in the PDSCH, and the MTC UE sends an ACK acknowledging the PDSCH at 1120. Later, the eNB determines to transmit a second PDSCH to the non-MTC UE at 1130. At 1132, the eNB sends a second PDCCH scheduling the second PDSCH to the non-MTC UE. The non-MTC UE decodes the second PDCCH and determines that the second PDCCH is scheduling the second PDSCH to the UE at 1134. At 1136, the eNB configures the second PDSCH with a Y-bit CRC. At 1138, the eNB transmits and the non-MTC UE receives the second PDSCH. The non-MTC UE calculates a Y-bit CRC for the second PDSCH and determines if the calculated CRC matches the CRC in the second PDSCH at 1140. In the exemplary call flow, the calculated CRC matches the CRC in the second PDSCH, and the UE sends an ACK acknowledging the second PDSCH at 1142.

According to aspects of the present disclosure, possible lengths of a CRC field may include the case of transmitting packets without a CRC (i.e., a zero-length CRC field), and any other CRC lengths (e.g., 16-bit CRC, 48-bit CRC), etc.

According to aspects of the present disclosure, determination of CRC field length can further depend on whether a transmission is to be sent on a broadcast channel. For example, a BS may be configured to always use a fixed CRC length, e.g., a 24-bit CRC field, for data transmissions sent on a broadcast channel.

Figure 12:
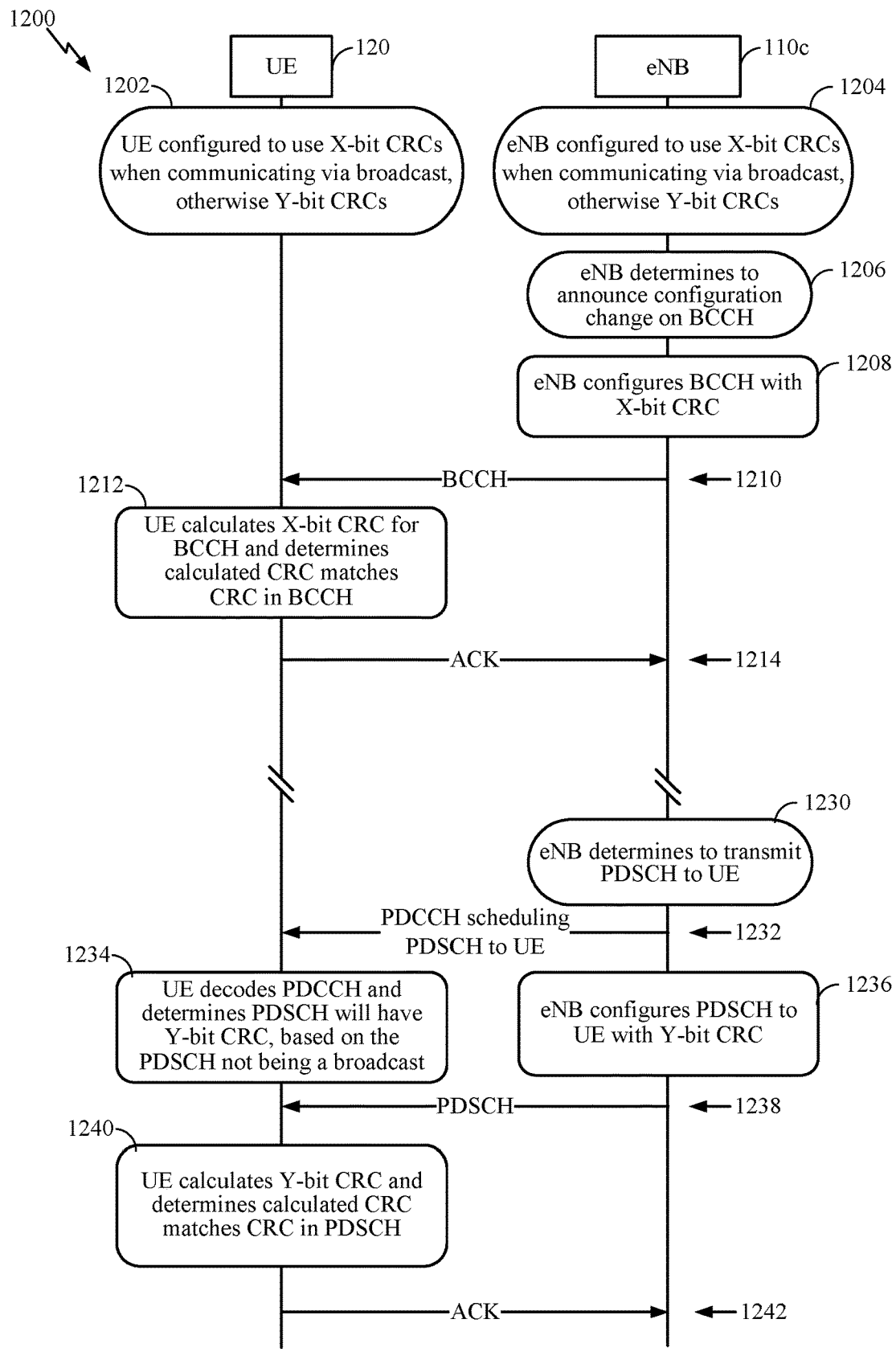
FIG. 12 illustrates an exemplary call flow of a wireless device obtaining an implicit indication of a CRC size based on whether communications are broadcast, according to aspects of the present disclosure.

FIG. 12 illustrates an exemplary call flow 1200 of a wireless device obtaining an implicit indication of a CRC size to use for communication on a physical wireless channel, based on whether the communications are sent on a broadcast channel. In the exemplary call flow, at 1202 and 1204, eNB 110c and UE 120 are configured to use CRCs of X (e.g. 24) bits when communicating via broadcast and to use CRCs of Y (e.g., 16) bits otherwise. The eNB determines to announce a configuration change (e.g., changing a TDM configuration) on a BCCH at 1206. At 1208, the eNB configures a BCCH with an X-bit CRC announcing the configuration change. At 1210, the eNB transmits and the UE receives the BCCH. The UE calculates an X-bit CRC for the BCCH and determines if the calculated CRC matches the CRC in the BCCH at 1212. In the exemplary call flow, the calculated CRC matches the CRC in the BCCH, and the UE sends an ACK acknowledging the BCCH at 1214. Later, the eNB determines to transmit a PDSCH to the UE at 1230. In the example, the PDSCH is a unicast PDSCH that is directed to the UE. At 1232, the eNB sends a PDCCH scheduling the PDSCH to the UE. The UE decodes the PDCCH and determines that the PDSCH the PDCCH is scheduling will have a Y-bit CRC, based on the PDSCH not being a broadcast at 1234. At 1236, the eNB configures the PDSCH with a Y-bit CRC. At 1238, the eNB transmits and the UE receives the PDSCH. The UE calculates a Y-bit CRC for the PDSCH and determines if the calculated CRC matches the CRC in the PDSCH at 1240. In the exemplary call flow, the calculated CRC matches the CRC in the PDSCH, and the UE sends an ACK acknowledging the PDSCH at 1242.

According to aspects of the present disclosure, determination of CRC field length can further depend on whether a transmission is semi-statically scheduled (e.g., part of a set of semi-persistently scheduled transmissions). For example, a BS may be configured to always use a 24-bit CRC field when transmitting data transmissions to a UE on semi-persistently scheduled unicast data channels, while the same BS may use a 24-bit CRC field or a 36-bit CRC field for dynamically scheduled unicast data channels to the same UE.

Figure 13:
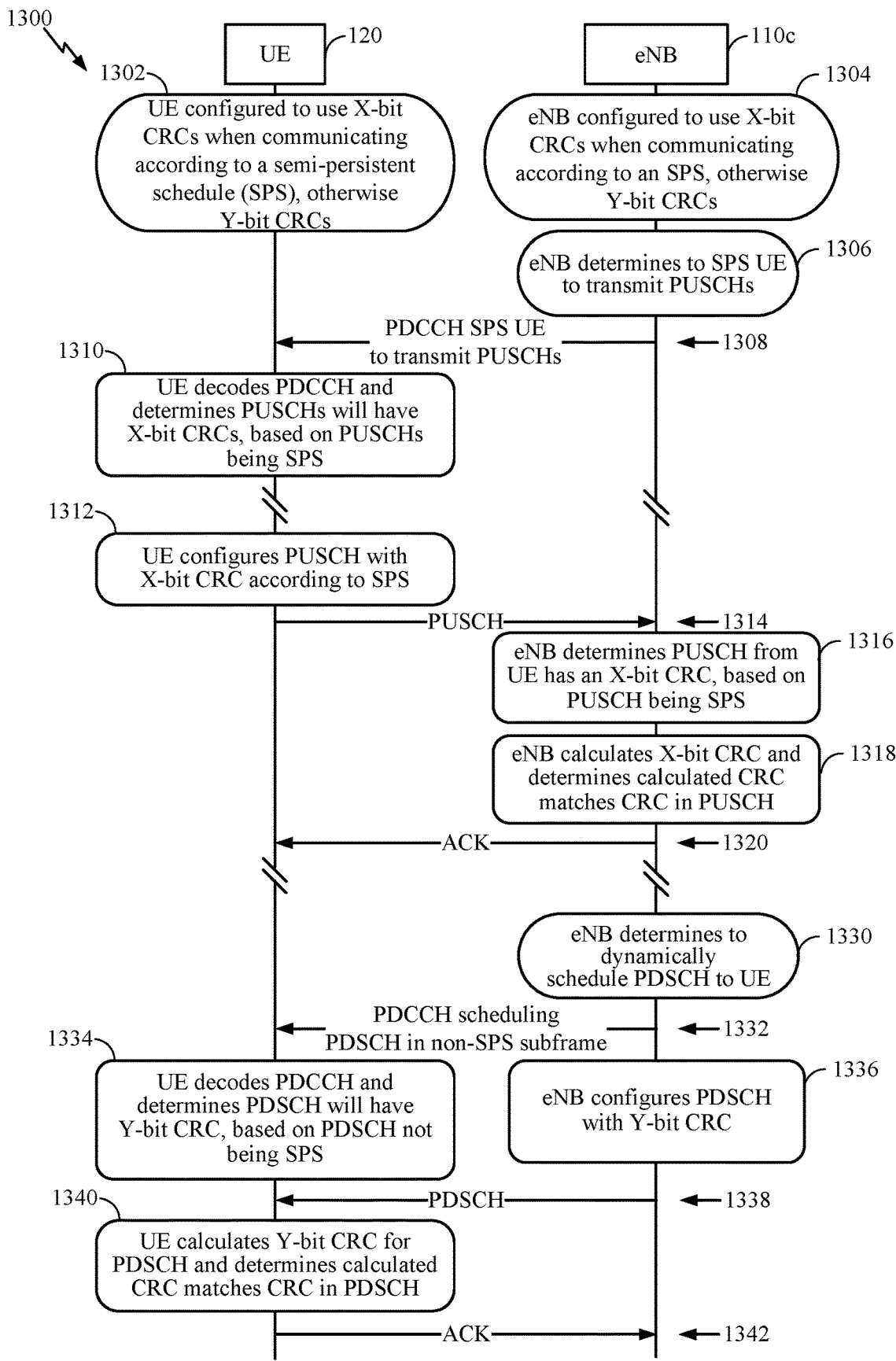
FIG. 13 illustrates an exemplary call flow of a wireless device obtaining an implicit indication of a CRC size, based on whether communications are semi-statically scheduled, according to aspects of the present disclosure.

FIG. 13 illustrates an exemplary call flow 1300 of a wireless device obtaining an implicit indication of a CRC size to use for communication on a physical wireless channel, based on whether the communications are semi-statically scheduled. In the exemplary call flow, at 1302 and 1304, eNB 110c and UE 120 are configured to use CRCs of X (e.g. 16) bits when communicating according to a semi-persistent schedule (SPS) and to use CRCs of Y (e.g., 24) bits otherwise. The eNB determines to semi-persistently schedule the UE to transmit PUSCHs (e.g., as part of a voice over IP call) at 1306. At 1308, the eNB sends a PDCCH semi-persistently scheduling the UE to transmit the PUSCHs. At 1310, the UE decodes the PDCCH and determines that the PUSCHs semi-persistently scheduled by the PDCCH will have X-bit CRCs, because the PUSCHs are SPS. Later, the UE configures a PUSCH with an X-bit CRC according to the SPS at 1312. At 1314, the UE transmits and the eNB receives the PUSCH. The eNB determines that the PUSCH has an X-bit CRC, based on the PUSCH being SPS at 1316. The eNB calculates an X-bit CRC for the PUSCH and determines if the calculated CRC matches the CRC in the PUSCH at 1318. In the exemplary call flow, the calculated CRC matches the CRC in the PUSCH, and the eNB sends an ACK acknowledging the BCCH at 1320. Still later, the eNB determines to dynamically (e.g., not semi-persistently) schedule a PDSCH to the UE at 1330. At 1332, the eNB sends a PDCCH scheduling the PDSCH to the UE. The UE decodes the PDCCH and determines that the PDSCH the PDCCH is scheduling will have a Y-bit CRC, based on the PDSCH not being SPS at 1334. At 1336, the eNB configures the PDSCH with a Y-bit CRC. At 1338, the eNB transmits and the UE receives the PDSCH. The UE calculates a Y-bit CRC for the PDSCH and determines if the calculated CRC matches the CRC in the PDSCH at 1340. In the exemplary call flow, the calculated CRC matches the CRC in the PDSCH, and the UE sends an ACK acknowledging the PDSCH at 1342.

According to aspects of the present disclosure, determination of CRC field length can further depend on one or more parameters associated with a corresponding control channel. For example, if a control channel of a first format (e.g., a PDCCH) is used to schedule a data transmission on a data channel, then a 24-bit CRC field is used (e.g., the transmitter of the data channel includes a 24-bit CRC field and the receiver error checks reception of the data channel using a 24-bit CRC) for the corresponding data channel, and if a control channel of a second format (e.g., an ePDCCH) is used to schedule a data transmission on the data channel, then a 36-bit CRC field is used for the corresponding data channel.

According to aspects of the present disclosure, determination of CRC field length can further depend on a transmission scheme indicated by a control channel corresponding to the data channel. For example, if the control channel is transmitted with a first scheme (e.g., of normal control channel reliability), a 24-bit CRC field is used for the corresponding data channel; if the control channel is transmitted with a second scheme (e.g., of enhanced control channel reliability), a 36-bit CRC field is used for the corresponding data channel. As a second example, if a control channel uses a 16-bit CRC field, then the corresponding data channel uses a 24-bit CRC field, and if the control channel uses a 24-bit CRC field, then the corresponding data channel uses a 36-bit CRC field. If CRC for a control channel is scrambled by a radio network temporary identifier (RNTI), the RNTI may have a length the same or different from that of the CRC length. As an example, a 24-bit CRC may be scrambled based on a 16-bit RNTI, e.g., scrambling the lowest significant 16 bits of the 24-bit CRC. As another example, a 16-bit CRC may be scrambled based on a 24-bit RNTI, e.g., by using the lowest significant 16 bits of the RNTI.

According to aspects of the present disclosure, determination of CRC field length may be a function of time-dependent or other dynamic parameters (e.g., subframe index) of a control channel or a data channel. For example, a device may be configured such that data transmissions occurring during subframes with odd (e.g., 1, 3, 5, 7, 9) subframe indices use 36-bit CRC fields, while data transmissions occurring during subframes with even subframe indices use 24-bit CRC fields.

Figure 14:
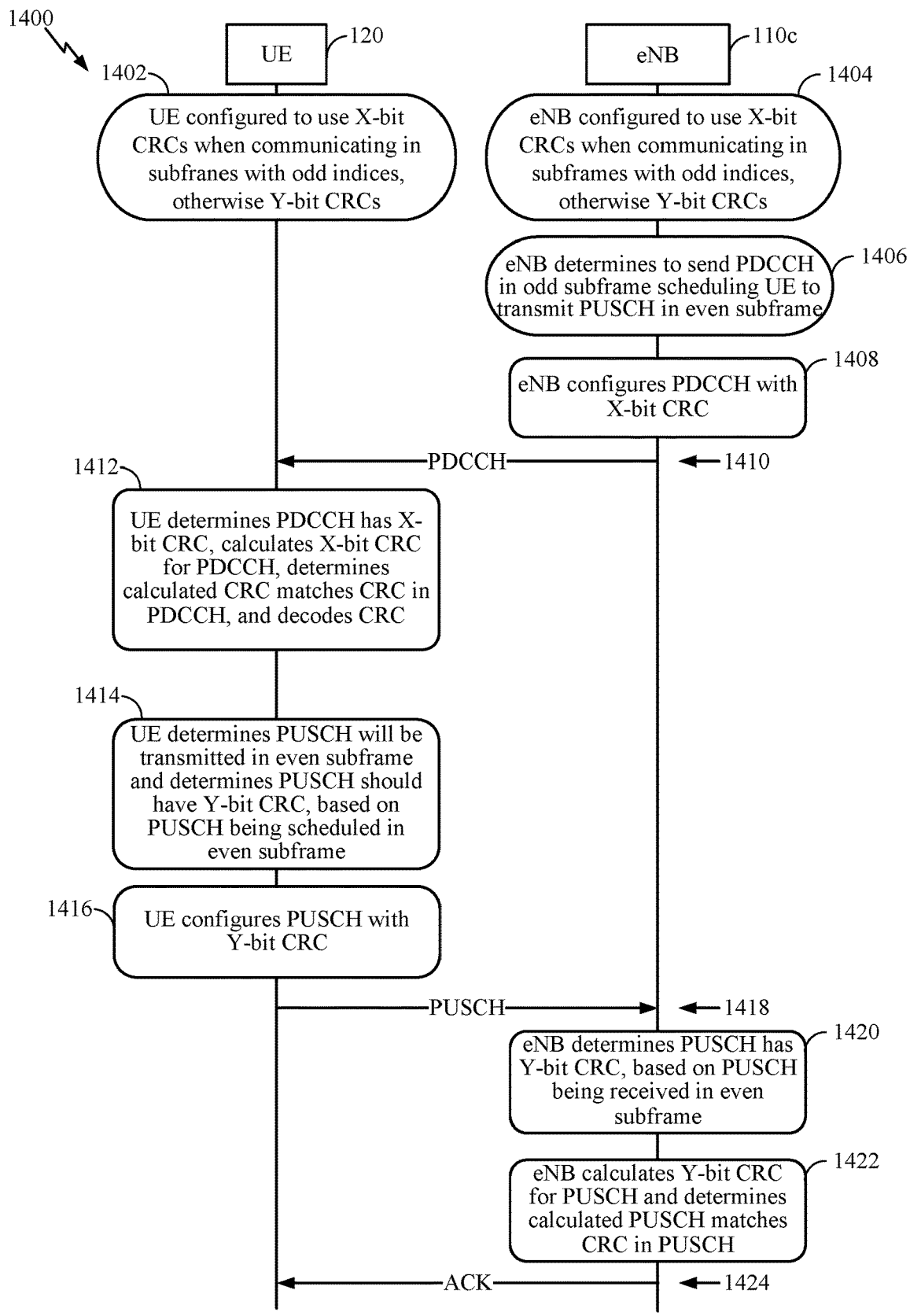
FIG. 14 illustrates an exemplary call flow of a wireless device obtaining an implicit indication of a CRC size based on a time-dependent parameter, according to aspects of the present disclosure.

FIG. 14 illustrates an exemplary call flow 1400 of a wireless device obtaining an implicit indication of a CRC size to use for communication on a physical wireless channel, based on a time-dependent parameter, specifically, a subframe index of the subframe of the communication. In the exemplary call flow, at 1402 and 1404, eNB 110c and UE 120 are configured to use CRCs of X (e.g. 16) bits when communicating in subframes with odd indices and to use CRCs of Y (e.g., 24) bits otherwise. The eNB determines to send a PDCCH in an odd subframe to schedule the UE to transmit a PUSCH in an even subframe at 1406. At 1408, the eNB configures the PDCCH with an X-bit CRC, because the PDCCH is to be transmitted in an odd subframe. At 1410, the eNB transmits and the UE receives the PDCCH. The UE determines, the PDCCH has an X-bit CRC based on receiving the PDCCH in an odd subframe, calculates an X-bit CRC for the PDCCH, determines that the calculated CRC matches the CRC in the PDCCH, and decodes the PDCCH at 1412. The UE determines that PUSCH scheduled by the PDCCH will be transmitted in an even subframe and that the PUSCH should have a Y-bit CRC, based on the PUSCH being scheduled for transmission in an even subframe at 1414. The UE configures a PUSCH with a Y-bit CRC at 1416. At 1418, the UE transmits and the eNB receives the PUSCH. The eNB determines that the PUSCH has a Y-bit CRC, based on the PUSCH being received in an even subframe at 1420. The eNB calculates a Y-bit CRC for the PUSCH and determines if the calculated CRC matches the CRC in the PUSCH at 1422. In the exemplary call flow, the calculated CRC matches the CRC in the PUSCH, and the eNB sends an ACK acknowledging the PUSCH at 1424.

According to aspects of the present disclosure, determination of CRC field length can also be applicable to control channels. For example, a device may be configured to associate a control channel transmission in a common search space with a 16-bit CRC and associate a control channel transmission in a UE-specific search space with a 24-bit CRC. That is, a BS may be configured to transmit control channels in a common search space (CSS) using 16-bit CRC fields, and the same BS may be configured to transmit control channels in a UE-specific search space (USS) using 24-bit CRC fields. Similarly, a UE may be configured to error check a control channel received from the CSS using a 16-bit CRC, while the same UE error checks a control channel received from the USS using a 24-bit CRC.

Figure 15:
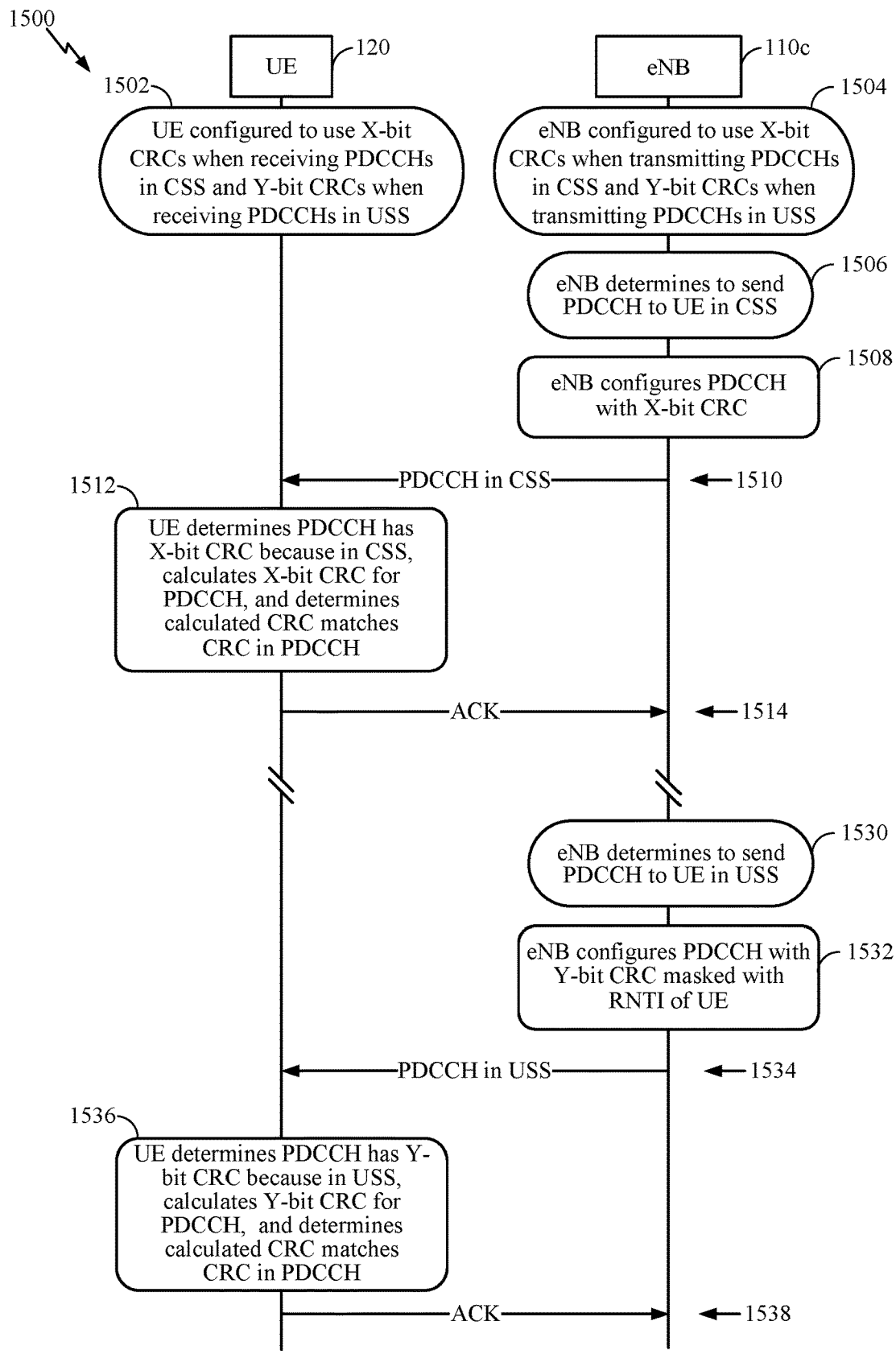
FIG. 15 illustrates an exemplary call flow of a wireless device obtaining an implicit indication of a CRC based on a search space, according to aspects of the present disclosure.

FIG. 15 illustrates an exemplary call flow 1500 of a wireless device obtaining an implicit indication of a CRC size to use for communication on a physical wireless channel, based on a search space used for transmitting a control channel. In the exemplary call flow, at 1502 and 1504, eNB 110c and UE 120 are configured to use CRCs of X (e.g. 16) bits when communicating (e.g., transmitting by the eNB, receiving by the UE) PDCCHs in a CSS and to use CRCs of Y (e.g., 24) bits when communicating PDCCHs in a USS. The eNB determines to send a PDCCH to the UE in the CSS at 1506. At 1508, the eNB configures a PDCCH with an X-bit CRC. At 1510, the eNB transmits and the UE receives the PDCCH. The UE determines that the PDCCH has an X-bit CRC because the PUSCH is received in the CSS, calculates an X-bit CRC for the PDCCH, and determines if the calculated CRC matches the CRC in the PDCCH at 1512. In the exemplary call flow, the calculated CRC matches the CRC in the PDCCH, and the UE sends an acknowledgment, which may be implicit, for the PDCCH at 1514. Later, the eNB determines to send a second PDCCH to the UE in the USS at 1530. At 1532, the eNB configures the second PDCCH with a Y-bit CRC. At 1534, the eNB transmits and the UE receives the second PDCCH. The UE determines the second PDCCH has a Y-bit CRC because the second PDCCH was received in the USS, calculates a Y-bit CRC for the second PDCCH, and determines if the calculated CRC matches the CRC in the second PDCCH at 1536. In the exemplary call flow, the calculated CRC matches the CRC in the second PDCCH, and the UE sends an ACK acknowledging the PDCCH at 1538.

According to aspects of the present disclosure, a UE may decode a control channel with multiple candidates, with some candidates associated with a first CRC length; and some other candidates associated with a second CRC length. For example, a UE may attempt to decode six control channel candidates from the CSS using 24-bit CRCs and sixteen control channel candidates from the USS using 16-bit CRCs.

According to aspects of the present disclosure, a device may determine a CRC field length of a data transmission depending on a quality of service (QoS) type of the data transmission.

According to aspects of the present disclosure, a device may determine a CRC field length of a DL, UL, and/or sidelink (e.g., device-to-device (D2D)) data transmission.

Aspects of the present disclosure provide methods and apparatus for wireless communications, including determining a size of a CRC field to be used for a transmission sent on a given type of physical wireless channel. According to aspects of the present disclosure, the processor 230, processor 270, TX data processor 214, TX data processor 238, RX data processor 260, RX data processor 242, and/or other processors and modules at the transmitter system 210 and/or receiver system 250 (see FIG. 2) may perform or direct apparatuses in performing such methods.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read only memory (EPROM), electrically erasable programmable read only memory (EEPROM), registers, hard disk, a removable disk, a compact disc read only memory (CD-ROM), or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. As used herein, a phrase referring to "at least one of" a list of items refers to any combination of those items, including single members. As an example, "at least one of: a, b, or c" is intended to cover a, b, c, a-b, a-c, b-c, and a-b-c., as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for wireless communications, comprising:
determining a cyclic redundancy check (CRC) length for a given type of control channel to be used for a transmission of the control channel of the given type, wherein:
when an allocation in a physical downlink control channel (PDCCH) received from a remote device indicates that a parameter of the transmission is greater than or equal to a threshold, the CRC length is determined to be a first CRC length; and
when the allocation in the PDCCH received from the remote device indicates that the parameter of the transmission is less than the threshold, the CRC length is determined to be a second CRC length smaller than the first CRC length; and
communicating with a wireless device via the transmission of the control channel with the determined CRC length.

2. The method of claim 1, wherein the determination is based on an indication, indicated on another control channel, of the CRC length to be used for the transmission of the control channel.

3. The method of claim 1, wherein the determination is based on an indication, indicated via radio resource control (RRC) signaling, of the CRC length to be used for the transmission of the control channel.

4. The method of claim 1, wherein the determination is based on a transport block size of the transmission of the control channel.

5. The method of claim 1, wherein the determination is based on a type of the wireless device.

6. The method of claim 1, wherein the determination is based on whether the transmission of the control channel comprises a broadcast transmission.

7. The method of claim 1, wherein the determination is based on a search space used for the transmission of the control channel.

8. The method of claim 1, wherein the determination is based on a time dependent parameter.

9. The method of claim 8, wherein the time dependent parameter comprises a subframe index.

10. The method of claim 1, wherein the determination is based on a traffic type of the control channel.

11. The method of claim 1, wherein the control channel is at least one of a downlink control channel or a sidelink control channel.

12. The method of claim 1, wherein the CRC length is determined from a plurality of possible CRC lengths including a length of zero bits, wherein the control channel is an uplink control channel.

13. An apparatus for wireless communications, comprising:
at least one processor configured to:
determine a cyclic redundancy check (CRC) length for a given type of control channel, to be used for a transmission of the control channel of the given type, wherein:
when an allocation in a physical downlink control channel (PDCCH) received from a remote device indicates that a parameter of the transmission is greater than or equal to a threshold, the CRC length is determined to be a first CRC length; and
when the allocation in the PDCCH received from the remote device indicates that the parameter of the transmission is less than the threshold, the CRC length is determined to be a second CRC length smaller than the first CRC length; and
communicate with a wireless device via the transmission of the control channel with the determined CRC length; and
a memory coupled with the at least one processor.

14. The apparatus of claim 13, wherein the at least one processor is configured to determine the CRC length based on an indication, indicated on another control channel, of the CRC length to be used for the transmission of the control channel.

15. The apparatus of claim 13, wherein the at least one processor is configured to determine the CRC length based on an indication, indicated via radio resource control (RRC) signaling, of the CRC length to be used for the transmission of the control channel.

16. The apparatus of claim 13, wherein the at least one processor is configured to determine the CRC length based on a transport block size of the transmission of the control channel.

17. The apparatus of claim 13, wherein the at least one processor is configured to determine the CRC length based on a type of the wireless device.

18. The apparatus of claim 13, wherein the at least one processor is configured to determine the CRC length based on whether the transmission of the control channel comprises a broadcast transmission.

19. The apparatus of claim 13, wherein the at least one processor is configured to determine the CRC length based on a search space used for the transmission of the control channel.

20. The apparatus of claim 13, wherein the at least one processor is configured to determine the CRC length based on a time dependent parameter.

21. The apparatus of claim 20, wherein the time dependent parameter comprises a subframe index.

22. The apparatus of claim 13, wherein the at least one processor is configured to determine the CRC length based on a traffic type of the control channel.

23. The apparatus of claim 13, wherein the control channel is at least one of a downlink control channel or a sidelink control channel.

24. The apparatus of claim 13, wherein the CRC length is determined from a plurality of possible CRC lengths including a length of zero bits, wherein the control channel is an uplink control channel.

25. An apparatus for wireless communications, comprising:
   means for determining a cyclic redundancy check (CRC) length, from a plurality of possible CRC lengths for a given type of control channel, to be used for a transmission of the control channel of the given type, wherein determining the CRC length comprises:
      when an allocation in a physical downlink control channel (PDCCH) received from a remote device indicates that a parameter of the transmission is greater than or equal to a threshold, the CRC length is determined to be a first CRC length; and
      when the allocation in the PDCCH received from the remote device indicates that the parameter of the transmission is less than the threshold, the CRC length is determined to be a second CRC length smaller than the first CRC length; and
   means for communicating with a wireless device via the transmission of the control channel with the determined CRC length.

26. A non-transitory computer readable medium storing computer executable code, the computer executable code, when executed by a processing system, causes the processing system to perform operations comprising:
   determining a cyclic redundancy check (CRC) length, from a plurality of possible CRC lengths for a given type of control channel, to be used for a transmission of the control channel of the given type, wherein determining the CRC length comprises:
      when an allocation in a physical downlink control channel (PDCCH) received from a remote device indicates that a parameter of the transmission is greater than or equal to a threshold, the CRC length is determined to be a first CRC length; and
      when the allocation in the PDCCH received from the remote device indicates that the parameter of the transmission is less than the threshold, the CRC length is determined to be a second CRC length smaller than the first CRC length; and
   communicating with a wireless device via the transmission of the control channel with the determined CRC length.

* * * * *